US012670931B2

(12) United States Patent
Boscolo Berto

(10) Patent No.: US 12,670,931 B2
(45) Date of Patent: Jun. 30, 2026

(54) METHOD OF OPERATING HARD DISK DRIVES, CORRESPONDING CONTROL CIRCUIT, HARD DISK DRIVE AND PROCESSING DEVICE

(71) Applicant: STMicroelectronics International N.V., Geneva (CH)

(72) Inventor: Michele Boscolo Berto, Milan (IT)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 19/290,758

(22) Filed: Aug. 5, 2025

(65) Prior Publication Data

US 2026/0100200 A1　Apr. 9, 2026

(30) Foreign Application Priority Data

Sep. 5, 2024　(IT) ........................ 102024000019822

(51) Int. Cl.
　　G11B 21/12　　(2006.01)
　　G11B 5/55　　(2006.01)
(52) U.S. Cl.
　　CPC ............ G11B 21/12 (2013.01); G11B 5/5547 (2013.01)
(58) Field of Classification Search
　　None
　　See application file for complete search history.

(56) References Cited

U.S. PATENT DOCUMENTS 5,969,899 A　* 10/1999　Utenick ............... G11B 5/6005
7,876,522 B1　　1/2011　Calaway et al.

| | | | |
|---|---|---|---|
| 8,189,284 B2 * | 5/2012 | Tieu ...................... | G11B 5/5526 |
| | | | 360/75 |
| 9,214,175 B1 * | 12/2015 | Xi .......................... | G11B 5/5543 |
| 9,466,330 B1 * | 10/2016 | Nishihara ................ | G11B 5/54 |
| 2004/0160695 A1 * | 8/2004 | Zayas ................... | G11B 5/5521 |
| | | | 360/75 |
| 2005/0013037 A1 * | 1/2005 | Tanner ................. | G11B 5/5526 |
| 2005/0168862 A1 * | 8/2005 | Jeong ................... | G11B 5/5534 |
| | | | 360/75 |
| 2008/0030891 A1 | 2/2008 | Kim et al. | |
| 2008/0198499 A1 * | 8/2008 | Linggajaya ............ | G11B 5/553 |
| | | | 360/75 |
| 2013/0200954 A1 * | 8/2013 | Li .......................... | H03G 3/001 |
| | | | 330/279 |
| 2013/0335737 A1 * | 12/2013 | Stein ..................... | G01J 3/4535 |
| | | | 356/326 |
| 2024/0265940 A1 * | 8/2024 | Boscolo Berto ........ | H02P 7/025 |
| 2024/0420737 A1 * | 12/2024 | Boscolo Berto ...... | H02P 25/034 |

* cited by examiner

*Primary Examiner* — Peter Vincent Agustin
(74) *Attorney, Agent, or Firm* — Slater Matsil, LLP

(57) ABSTRACT

A voice coil motor (VCM) in a hard disk drive having a VCM resistance is driven based on a value of the back electromotive force (BEMF) of the VCM reconstructed from a voltage drop indicative of the intensity of a current flowing towards the VCM detected by an amperometry resistance. The BEMF of the VCM is reconstructed as a function of the voltage drop via a first gain value, determined as the ratio of the VCM resistance to the amperometry resistance. A calibrated gain value, indicative of the ratio of the actual VCM resistance to the amperometry resistance is produced by applying a correction factor to the first gain value. The VCM is driven continuously based on a value of the BEMF of the VCM reconstructed by applying to the voltage drop the calibrated gain value.

20 Claims, 8 Drawing Sheets

METHOD OF OPERATING HARD DISK DRIVES, CORRESPONDING CONTROL CIRCUIT, HARD DISK DRIVE AND PROCESSING DEVICE

CROSS REFERENCED TO RELATED APPLICATIONS

This application claims the priority benefit of Italian Patent Application No. 102024000019822 filed on Sep. 5, 2024, entitled "Method of Operating Hard Disk Drives, Corresponding Control Circuit, Hard Disk Drive and Processing Device," which is hereby incorporated herein by reference to the maximum extent allowable by law.

TECHNICAL FIELD

The description relates to hard disk drives (HDDs).

Solutions as described herein can be applied, for instance, in hard disk drives used in processing devices such as computers, servers, data centers and the like.

BACKGROUND

Hard disk drive (HDD) devices include so-called voice-coil motors (VCM motors or, briefly VCMs) that are used for positioning read-and-write heads over the surface of the hard disk where data is stored. Positioning includes phases where tracks are searched or sought (track seeking) or phases where tracks are followed (track following).

The read and write heads are positioned over the disk surface (only) when the hard disk drive is in an operating condition and are parked in a safe zone when the HDD is inactive (turned off) or active in a low-power mode (idle).

In present-day hard disks the safety zone is provided at an external part of the disk, at the end portion of a ramp located at an outermost area of the disk called "outer diameter" (OD).

When the HDD passes from a non-operational condition to an operational condition, the heads are moved from the parking position (end portion of the ramp) to the surface of the disk; this operation is referred to as "load" while the reverse operation, during which the heads move from the disk surface to the parking area is referred to as "unload" or "retract".

Load/unload operations are carried out at a speed that is controlled and low enough to preserve the integrity of the heads during the entire process.

During an unload phase, the heads collide against an edge of the ramp and an end-of-travel position (EOT); during a load phase the heads undergo a sudden descent from the ramp and a subsequent positioning over the disk surface.

Load operations are servo-assisted via firmware (FW) in a main microcontroller of the HDD; unload/retract operations can be servo-assisted or managed via dedicated hardware (HW).

During load/unload operations, the information (servo data) present on the hard disk is not available for access, and the VCM speed cannot be estimated using these servo data.

The speed of the VCM is thus extrapolated; two methods are commonly used for that purpose: direct reading of the Back ElectroMotive Force (BEMF) of the VCM or reconstruction of the BEMF via dedicated circuitry usually referred to as BEMF monitor.

Direct reading of the BEMF is feasible when the VCM is driven in a discontinuous mode where energization phases ("on" times, $T_{ON}$) alternate with non-energization phases ("off" times, $T_{OFF}$).

During the off times $T_{OFF}$, the motor is not energized; the current circulating in the motor is zero and the BEMF voltage—which is (directly) proportional to the motor speed—can be measured directly across the motor windings.

Discontinuous driving does not involve calibration and is therefore commonly used in emergency conditions (emergency retract, in response to "power off" conditions, for instance).

Discontinuous driving is however less attractive than continuous driving due to factors such as a greater speed ripple, a lower speed control bandwidth, and a lower average driving torque.

For that reason, discontinuous driving is most often resorted to only in emergency conditions and continuous driving is used in those cases where the HDD microcontroller remains in operation, which facilitates calibrating the BEMF monitor circuitry.

Continuous driving provides better performance in response to a correctly calibrated circuit being available in order to reconstruct the BEMF (via a BEMF Monitor).

In certain cases, such a correct calibration is hardly feasible.

For instance, in certain systems, emergency conditions may arise where it is not possible to perform calibration operations in so far as these involve rather long times and may require that the motor should be stopped.

SUMMARY

An object of solutions described herein is to contribute in addressing the issues discussed in the foregoing.

According to solutions described herein, that object is achieved with a method as set forth in the claims that follow.

Solutions as described herein relate to a corresponding controller circuit for hard disk drives.

Solutions as described herein relate to a corresponding hard disk drive.

Solutions as described herein relate to a corresponding processing device equipped with one or more hard disk drives.

A computer, a server, or a data center are exemplary of such a device.

The claims are an integral part of the technical teaching on the embodiments as provided herein.

Solutions as described herein facilitate a fast calibration of a BEMF monitor circuit, thus making it possible to resort to retract procedures that are performed with continuous driving and are more performing.

Calibration as described herein can be used also in non-stationary VCM motor conditions. This facilitates calibrating BEMF monitor circuits in conditions/contexts where conventional calibration methods cannot be used: VCM "seek" or VCM "brake" phases (both characterized by a high speed of the VCM) are exemplary of such non-stationary VCM motor conditions.

Calibration of BEMF monitor circuitry as described herein can be used for reconstructing of a BEMF voltage of a VCM motor driven in a continuous mode.

Calibration of BEMF monitor circuitry as described herein can be obtained by multiplying an initial gain by a "correction factor" calculated using the output voltage of the BEMF monitor circuit (ReconstructedBEMF), the voltage applied to the motor (Vvcm), and the true BEMF voltage of the motor (TrueBEMF).

For instance, such a correction factor can be expressed as:

$$\text{CorrectionFactor} = (V_{vcm} - TrueBEMF))/(V_{vcm} - \text{Reconstructed } BEMF))$$

where $V_{vcm}$ is the voltage across the VCM motor, TrueBEMF is the actual BEMF voltage of the motor, and ReconstructedBEMF is the output voltage of the BEMF Monitor circuit.

Calibration of BEMF monitor circuitry as described herein may involve applying a (current or voltage) pulse, two (current or voltage) pulses or even three or more (current or voltage) pulses to a VCM motor.

BRIEF DESCRIPTION OF THE DRAWINGS

Solutions proposed herein will now be described, by way of example only, with reference to the annexed figures, wherein:

FIG. 2 is a block diagram of a hard disk drive (HDD) equipped with a BEMF reconstruction circuit wherein solutions as proposed herein can be applied;

FIG. 6 is a diagram showing possible time behaviors (waveforms) of VCM current, VCM speed and VCM position according to an alternative way of implementing solutions as described herein;

FIG. 8 is a diagram showing possible time behaviors (waveforms) of VCM current, VCM speed and VCM position according to still another alternative way of implementing solutions as described herein.

Corresponding numerals and symbols in the different figures generally refer to corresponding parts unless otherwise indicated.

Figure 1:
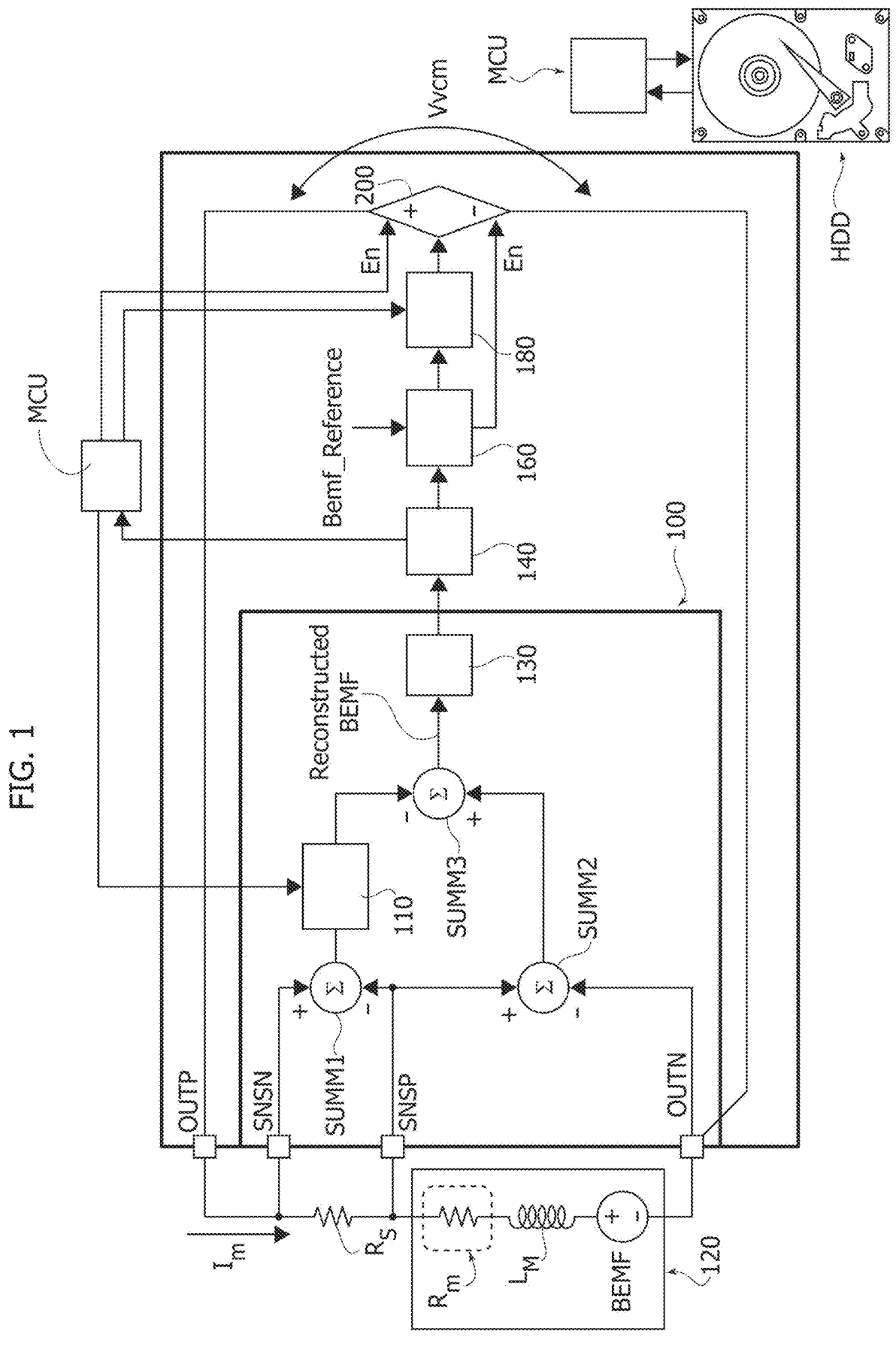
FIG. 1 is a block diagram of a hard disk drive (HDD) equipped with a BEMF reconstruction circuit ("BEMF monitor") used for the reconstruction of the BEMF during VCM driving.

The figures are drawn to clearly illustrate the relevant aspects of the embodiments and are not necessarily drawn to scale.

The edges of features drawn in the figures do not necessarily indicate the termination or the extent of the feature. Also, for the sake of simplicity and ease of explanation, a same designation may be applied throughout this description to designate a circuit node or line as well as a signal occurring at that node or line.

The quantitative values indicated in (or derivable from) any of the figures annexed herewith are merely exemplary and non-limiting.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is included in at least one embodiment. Hence, phrases such as "in an embodiment" or "in one embodiment" that may be present in one or more points of the present description do not necessarily refer to one and the same embodiment. Moreover, particular configurations, structures, or characteristics may be combined in any adequate way in one or more embodiments.

The headings/references used herein are provided merely for convenience and hence do not define the extent of protection or the scope of the embodiments.

Throughout the figures annexed herein, unless the context indicates otherwise, like parts or elements are indicated with like references/numerals and a corresponding description will not be repeated for the sake of brevity.

Once more, for the sake of simplicity and ease of explanation, a same designation may be applied throughout this description to designate:

a certain node or line as well as a signal occurring at that node or line, and/or a certain component (such as a capacitor, resistor or inductor of coil) as well as electrical parameters (capacitance, resistance, inductance) thereof.

As discussed in the introductory portion of this description, HDD is a shortened designation for hard disk drive.

A hard disk drive is a component of various types of processing devices such as personal computers, servers, data centers or the like and is the physical location where information is stored.

Hard disk drives (HDDs) employ a spindle motor to rotate one or more disks as well as one or more voice coil motors or VCMs to move the read-and-write heads with respect to the disk(s). That is, the spindle motor is used to spin the hard disk(s) on which data are stored and the VCM motor or motors is/are used to position the read-and-write heads on the surface of hard disk(s).

Hard disk drives thus include at least two motors (spindle and VCM) that are driven by power semiconductor devices (integrated circuits) usually referred to as power combo or PLSI (an acronym for Power Large Scale Integration).

The spindle motor is used to rotate the hard disks on which data are stored, the VCM motor is used to position the read/write heads on the surface of the hard disks.

In present-day HDDs, a ramp is provided at an external portion of the disk (outer diameter, OD) that is used to safely position the read/write heads in a parking position when these heads are not in use.

The procedure to move the heads from the parking position to the operating position on the disk surface is currently referred to as "VCM load" while the reverse procedure, to move the heads from the disk surface to the parking position, is currently referred to as "VCM unload" or "VCM retract".

The load and unload procedures are carried out at a controlled speed to avoid damaging the heads or damaging the disk surface (disk scratch).

The retract procedure is usually managed via firmware by a main HDD controller (a microprocessor, for instance).

In certain circumstances the controller may not be active (due to a loss of power supply, for example) and the retract procedure is carried out autonomously via dedicated hardware. In these emergency cases, the retract procedure is called emergency retract.

As already discussed, a retract procedure in a continuous mode involves a reconstruction circuit of the Back Electro-Motive Force of the motor (BEMF monitor) and a careful calibration plays a role in facilitating adequate operation of such a reconstruction circuit.

FIG. 1 is a block diagram of a circuit 100 that can be used for Back ElectroMotive Force, BEMF reconstruction during driving of a Voice Coil Motor, VCM, designated with reference 120 and represented as a (voltage) source of Back ElectroMotive Force, BEMF with an associated (series) inductance $L_M$ and resistance Rm.

A BEMF reconstruction circuit 100 as illustrated in FIG. 1 can be used when load/unload procedures are performed in a continuous mode, in conditions where no current interruptions occur that may allow reading the BEMF directly across the VCM terminals.

A BEMF reconstruction circuit 100 as illustrated in FIG. 1 comprises input nodes SNSP and OUTN coupled across a voice coil motor (VCM) 120, plus at least one further input node SNSN with a resistor Rs coupled between the nodes SNSN and SNSP. The voltage across the resistor Rs (the voltage drop between the nodes SNSN and SNSP) is a measure of a current $I_m$ that flows towards the VCM 120 starting from a supply node OUTP.

A first summation node SUMM1 (with sign) produces a signal based on the difference between the voltages at the nodes SNSN and SNSP, which is thus a measure of the current $I_m$ and is amplified via a first gain stage 110.

A second summation node SUMM2 (with sign) produces a signal based on the difference between the voltages at the nodes SNSP and OUTN, which is thus a measure of the voltage drop across the VCM 120.

A third summation node SUMM3 (with sign) produces a signal based on the difference between the voltage at the output of the second summation node SUMM2 and the voltage at the output of the first summation node SUMM1. The difference signal ReconstructedBEMF thus obtained is amplified via a second gain stage 130 to produce a signal that can be converted to digital via an analog-to-digital converter (ADC) 140.

An (emergency) retract logic block 160 cascaded to the ADC 140 receives a reference value for the BEMF (that represents the reference speed during retract), labeled Bemf Reference. A digital-to-analog converter (DAC) 180 is in turn cascaded to the retract logic block 160 to provide a signal to be applied to a (power) voltage amplifier 200 used to supply a voltage Vvcm between the nodes OUTP and OUTN to control operation of the VCM during a retract phase. The power amplifier 200 is enabled by the retract logic block 160 via an enable signal En.

A controller unit MCU-such as a microprocessor configured to supervise HDD operation as schematically represented at the right bottom portion of FIG. 1—is (also) sensitive to the signal from the ADC 140 and is configured to control correspondingly the gain stage 110 and the DAC 180 while also providing an enable signal En to the (power) amplifier 200.

It is otherwise noted (this also applies to the description provided in connection with the further figures) that the VCM 120 per se may not be a part of the circuitry for BEMF reconstruction/VCM control as supplied. That circuitry and the VCM can be connected only by the end user.

The representation of a BEMF monitor circuit in FIG. 1 highlights the role of the gain block 110 (the "A1Gain" block); adequate calibration thereof facilitates a correct reconstruction of the BEMF in so far as a correct reconstruction of the BEMF is provided in response to the gain of the block 110 being determined as the ratio of the resistance of the VCM motor 120 (illustrated for clarity as a distinct element Rm in FIGS. 1 and 2) and the resistance value Rs of the sensing resistor placed in series with the motor.

The value of Rm varies (significantly) with temperature in the (otherwise common) case of a copper winding, for instance; therefore, the ratio Rm/Rs is not constant over time and may exhibit variations that can be very high in view of the temperature range envisaged for operation of a VCM.

A BEMF monitor circuit as represented in FIG. 1 also includes an additional gain block 130 with the purpose of adapting the dynamics of the output signal (the reconstructed BEMF) to the dynamics of the ADC converter 140 dedicated to its digital conversion.

It is observed that FIG. 1 illustrates, in addition to the BEMF monitor circuit 100 proper, also circuits that are used to control the VCM 120 during load/unload phases managed by the HDD microcontroller MCU with the emergency retract logic circuit 160 intended to be used in the brake and retract procedures during emergency conditions (dedicated HW).

As discussed, a VCM motor 120 can be driven discontinuously during emergency conditions, in which case the voltage converted by the ADC circuit 140 may represent the real BEMF: in fact, in the absence of a current though the VCM, the BEMF monitor circuit 100 reproduces the real BEMF. Both the microcontroller MCU and the emergency retract logic circuit 160 can thus receive (via the ADC 140) a signal representative of the VCM speed and provide a command (to the DAC 180) suitable for maintaining a desired VCM speed.

Calibration procedures of the "A1Gain" (namely the gain of the block 110) can be based on a recursive search for an optimal gain that facilitates outputting a desired value for the BEMF monitor circuit.

Such calibration methods may benefit from the VCM speed being zero or close to zero so that the A1Gain can be modified until the output of the BEMF monitor circuit 100 is equal to or close to zero. When carrying out calibration, the current in the VCM motor 120 should desirably be non-zero and the greater the current used in calibration, the greater the accuracy in calibrating the A1Gain.

By way of example, calibration of the A1Gain can be carried out before a load procedure, with the VCM motor in a park position: a current can be forced through the VCM motor with a polarity such has to create a driving torque towards the End-Of-Travel (EOT). In these conditions the motor is unable to move, which inevitably translates into a stationary motor condition.

The output of the BEMF monitor circuit (the reconstructed BEMF) can thus be measured and the A1Gain modified until the output assumes a zero value, that is a value equal to the actual speed of the VCM motor, which is (precisely) zero.

Still by way of example, calibration of the A1Gain can be carried out before an unload procedure (the read/write heads are initially on the disk surface) with the heads positioned near the innermost part of the disk (inner disk or ID) until an internal end position IDCS (Inner Diameter Crash Stop) is reached.

With the motor in the IDCS position, a current is forced into the motor with such polarity as to create a driving torque towards the IDCS position. In these conditions, the VCM motor is again unable to move and a stationary motor condition is therefore facilitated. Also in this case, the output of the BEMF monitor circuit can be measured and the A1Gain modified until the output assumes a zero value, that is a value equal to the actual speed of the VCM motor, which—also in this case—is (precisely) zero.

Calibration procedures of the A1Gain performed prior to an unload procedure cannot be applied satisfactorily in an emergency situation, for example in the event of loss of the HDD power source. In these cases, an emergency retract should take place immediately, without those latencies that calibration procedures as discussed previously would inevitably introduce.

Solutions as described herein facilitate calibrating the A1Gain in a (much) shorter time and, more to the point, without having to rely on zero VCM speed conditions.

Solutions as described herein thus facilitate calibrating the A1Gain even in emergency conditions and facilitate emergency retract with continuous (non-discontinuous) driving applied to the VCM: this entails various advantages such as reduced speed ripple, improved control bandwidth, higher average driving torque, and substantial absence of noise which is likely to be associated with discontinuous control (with an operating frequency around 1 kHz, for instance).

Solutions as described herein offer the additional advantage of facilitating gain calibration also during a possible VCM braking procedure. This facilitates creating a closed-loop braking procedure where the VCM motor speed can be controlled via the BEMF monitor circuit.

A closed-loop VCM braking procedure that uses the output signal from the BEMF monitor as a feedback signal is suited to be carried out in a continuous mode, which is (much) more effective if compared to closed-loop braking procedures that, in the case of emergency, involve discontinuous driving.

Calibration as described herein is otherwise not limited to being applied in emergency conditions (braking and emergency retract, for instance). Calibration as described herein can be used also during normal operation of an HDD; for instance, calibration as described herein can be performed during a seek procedure or be launched during track following: calibration as described herein does not rely on a zero speed of the VCM motor.

Various possible ways of implementing solutions as described herein will be discussed in the following.

Figure 2:
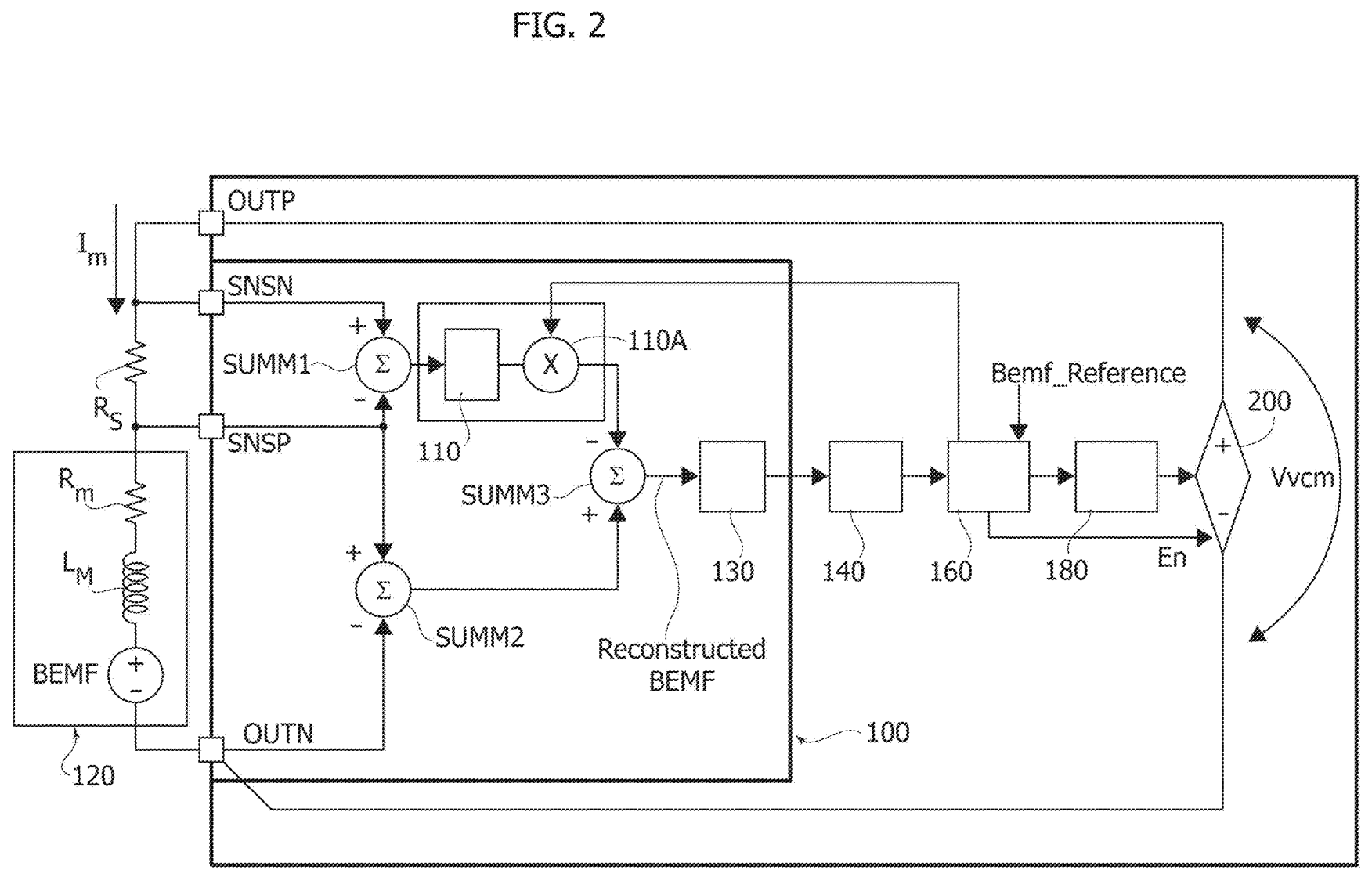

A first way of implementing solutions as described herein is presented in FIG. 2, wherein calibration is based on the calculation of a correction factor to be applied, as a gain correction, to a non-optimized A1Gain. In this case, calibration does not involve forcing a current into the VCM motor 120, which is assumed to be already present in the context takes as an example. This could be the case of calibration activated during a seek procedure or during a brake procedure, where the current used by the seek (or brake) feature itself is exploited to facilitate achieving the conditions for calibration (non-zero current).

Figure 6:
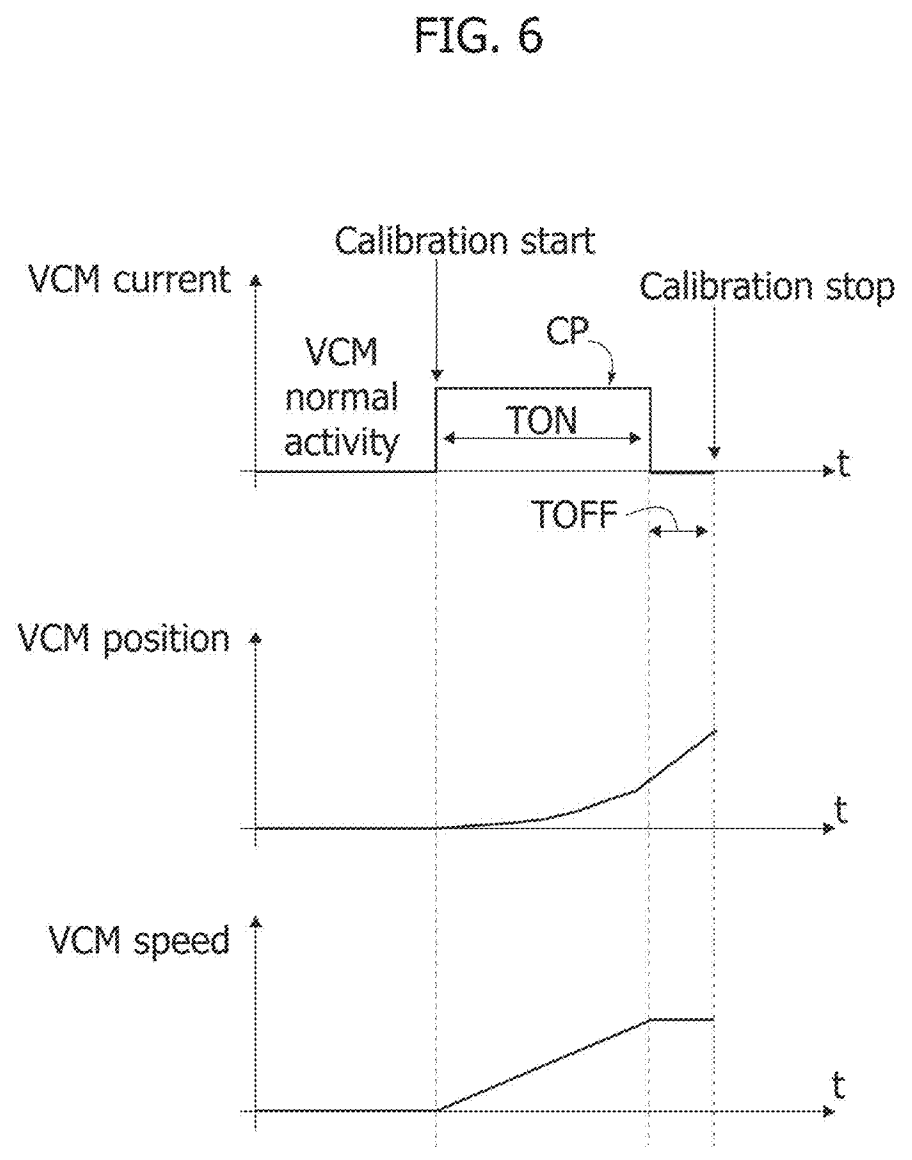

In a second way of implementing solutions as described herein (as illustrated in FIG. 6) calibration is applied in a context where the VCM current is zero or nearly zero.

In that case, calibration involves forcing a current (or voltage) pulse followed by calibration proper (calculation of a correction factor). At the end of such a calibration procedure, the speed and position of the VCM motor 120 will be different from the speed and position of the VCM motor prior to calibration.

Figure 7:
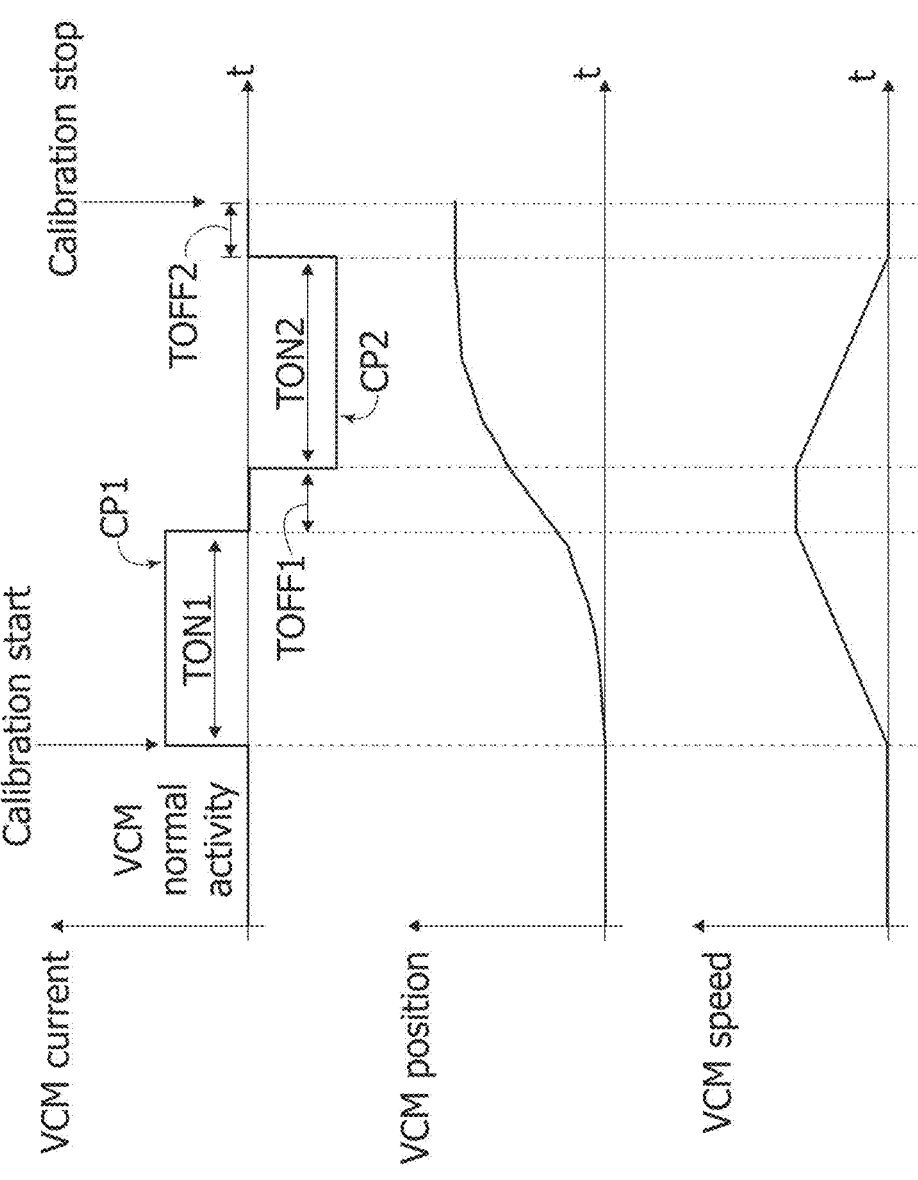
FIG. 7 is a diagram showing possible time behaviors (waveforms) of VCM current, VCM speed and VCM position according to another alternative way of implementing solutions as described herein.
Figure 8:
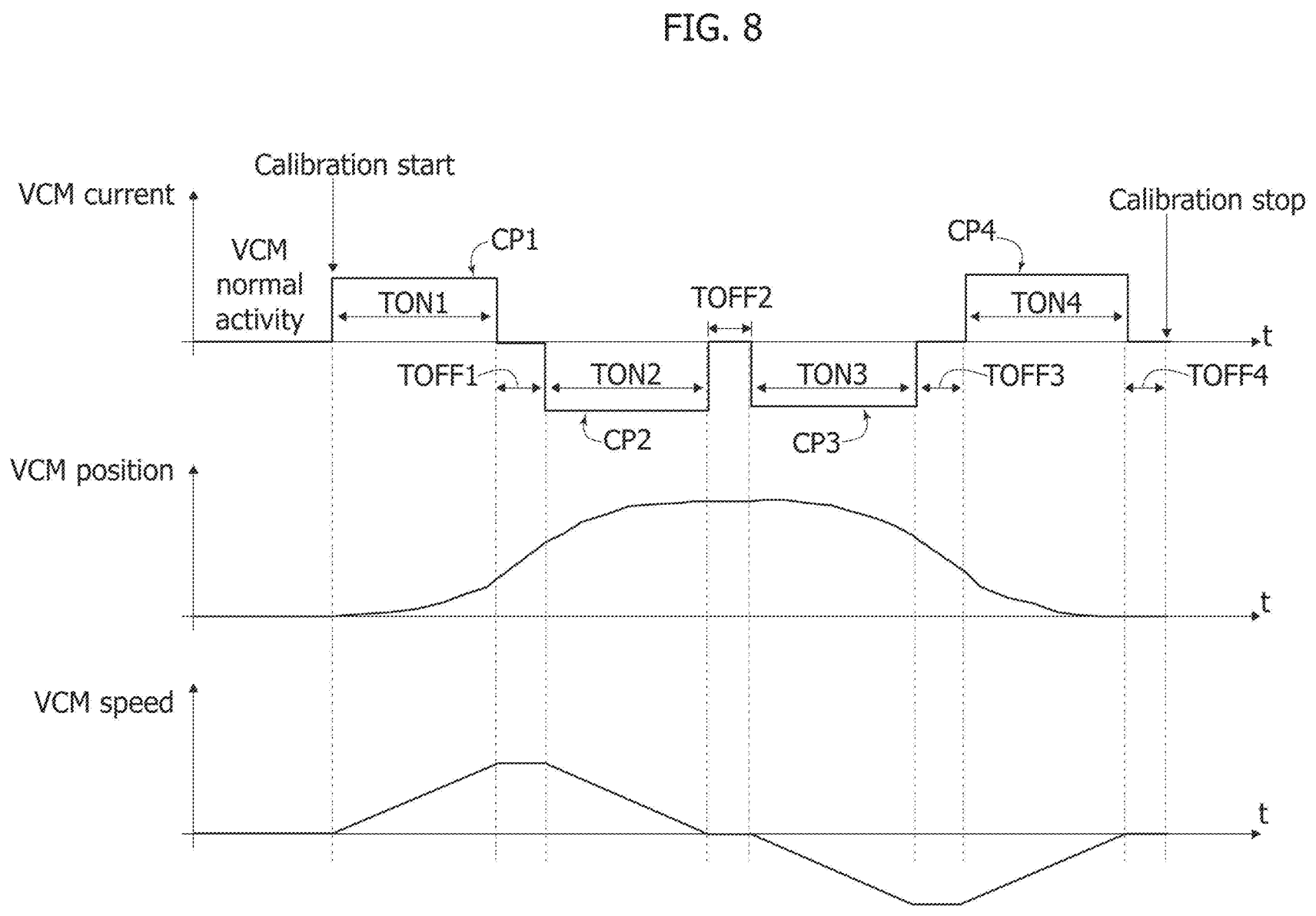

A third and a fourth way of implementing solutions as described herein (as illustrated in FIG. 7 and FIG. 8) can be applied in cases where a possible difference between the initial and final values of speed and position of the VCM motor may represent an issue.

The third way of implementing solutions as described herein (FIG. 7) involves the application of two current (or voltage) pulses in rapid sequence.

These two current (or voltage) pulses facilitate restoring an initial speed (velocity) for the VCM motor. For instance, if the initial speed of the VCM motor is zero, then the speed at the end of the second pulse will likewise be zero.

Actual calibration (calculation of a correction factor) can be carried out at the end of the first pulse or at the end of the second pulse or at the end of each pulse: in the latter case two calibration steps will actually be carried out in rapid sequence. In this third way of implementing solutions as described herein, the initial and final speed values will coincide but the final position of the VCM motor at the end of calibration will (still) be different from the position that the VCM before the two current (or voltage) pulses are applied.

The fourth way of implementing solutions as described herein (FIG. 8) can be applied in those circumstances where a difference between the initial and final positions of the VCM motor may represent an issue.

The fourth way of implementing solutions as described herein involves applying three (or more) current (or voltage) pulses in rapid sequence. These current (or voltage) pulses facilitate restoring both the initial speed and the initial position of the VCM motor.

Actual calibration (calculation of a correction factor) can be carried out at the end of any current (or voltage) pulse or at the end of each current (or voltage) pulse. In the latter case there will be a number of calibrations steps equal to the number of current (or voltage) pulses applied.

Solutions as described herein facilitate calibrating a BEMF monitor circuit used for the reconstruction of the BEMF of a VCM motor 120.

In a (conventional) BEMF monitor circuit as illustrated in FIG. 1, the gain of the block 110 (A1Gain) is varied recursively until a desired output value is reached.

Conversely, in solutions as described herein, a correction is applied to an initial value of the A1Gain (this can be notionally any value) using an additional gain (correction factor) which is obtained from a mathematical calculation.

This approach is represented in FIG. 2, where parts or elements like parts or elements already introduced in connection with FIG. 1 are indicated by like reference symbols, and a corresponding detailed description will not be repeated for brevity.

It is otherwise noted that, for brevity and clarity of presentation, FIG. 2 reproduces only those parts or elements of FIG. 1 that are discussed in the following.

In fact, both FIGS. 1 and 2 are exemplary of solutions of operating a voice coil motor, VCM 120 in a hard disk drive HDD wherein the VCM (120) has a (nominal) VCM resistance Rm. The VCM 120 is driven based on a value of the back electromotive force, BEMF of the VCM reconstructed (at the block 130, for instance) as a function of a voltage drop (available at the output of the node SUMM1) that is indicative of the voltage drop between the nodes SNSN and SNSP and is thus indicative of the intensity of the current $I_m$ flowing towards the VCM 120 as detected by the amperometry resistance $R_s$.

Referring to the back electromotive force, BEMF of the VCM being reconstructed "as a function of" a voltage drop indicative of the intensity of the current $I_m$ flowing towards the VCM 120 as detected by the amperometry resistance $R_s$ (as available at the output of the node SUMM1, for instance) is not otherwise to be construed to mean that BEMF of the VCM is reconstructed—solely—from such a voltage drop.

In fact, solutions described herein in connection with figures from FIG. 2 onwards advantageously include nodes SUMM2 and SUMM3 that retain the same function already described in connection with FIG. 1, namely:

the second summation node SUMM2 produces a signal based on the difference between the voltages at the nodes SNSP and OUTN, which is thus a measure of the voltage drop across the VCM 120; and the third summation node SUMM3 produces a signal based on the difference between the voltage at the output of the second summation node SUMM2 and a voltage derived from the output of the block 110 that, in the case of FIG. 2, has cascaded thereto a multiplier 110A. The difference signal obtained at the output of the node SUMM3 is indicative of a reconstructed BEMF that can be amplified via a second gain stage 130 to produce a signal suited to be converted to digital via the analog-to-digital converter ADC 140.

Solutions as proposed herein are otherwise primarily concerned with the way the voltage drop available at the output of the node SUMM1 (indicative of the intensity of the current $I_m$ flowing towards the VCM 120 as detected by the amperometry resistance Rs) contributes to the reconstructed BEMF so that the back electromotive force, BEMF of the VCM is reconstructed as a function of such a voltage drop (and, possibly, as a function also of the output from the node SUMM2 that is supplied to the node SUMM3).

At least in principle, solutions as proposed herein can be applied in cases where reconstructed BEMF is obtained even without the provision of circuitry as exemplified here by the summation nodes SUMM2 and SUMM3.

Solutions as proposed herein are in fact intended to address issues that arise in conventional solutions as illustrated in FIG. 1 in so far as the back electromotive force, BEMF of the VCM is reconstructed as a function of that voltage drop via a gain value, A1Gain that is determined by the ratio of the VCM resistance (likely to vary markedly with temperature, for instance) to the amperometry resistance $R_s$.

In solutions as proposed herein and illustrated in figures from FIG. 2 onwards, a correction factor (CorrectionFactor) is applied (via the multiplier 110A, for instance) to the gain value, A1Gain, to produce a calibrated gain value, NewA1Gain.

As discussed in the following, the calibrated gain value, NewA1Gain is indicative of a ratio TrueRm/Rs of an actual VCM resistance TrueRm to the amperometry resistance $R_s$.

In solutions as proposed herein, the VCM 120 is driven continuously based on a value of the back electromotive force, BEMF of the VCM reconstructed (at the block 130, for instance) applying to the voltage drop at the output of the node SUMM1 the calibrated gain value, NewA1Gain.

In FIG. 2 a multiplier 110A is illustrated coupled to the output of the block 110. The signal applied to the summation node SUMM3 corresponds to the output (and thus the gain) of the block 110 "corrected" by a correction factor given by a multiplying factor of the multiplier 110A that is derived from the retract logic 160 block (or derived from the MCU—this option is not represented for simplicity—in case calibration is FW assisted).

The corrected (calibrated) value (referred to as NewA1Gain) can be obtained from the "uncorrected" value (referred to as A1Gain) based on the formula $$NewA1Gain = A1Gain * CorrectionFactor$$

where CorrectionFactor is a factor that facilitates the BEMF monitor circuit 100 in correctly reconstructing the BEMF value of the VCM.

That is, in solutions as described herein, the correction factor CorrectionFactor is applied to the gain value, A1Gain, by multiplying (via the multiplier 100A) the gain value, A1Gain by the correction factor CorrectionFactor.

In solutions as described herein, calibration essentially involves calculating the factor CorrectionFactor, which results in making calibration (much) faster than in conventional solution, while also making it possible to perform calibration on a moving VCM motor.

FIG. 2 illustrates a basic way of implementing solutions as described herein where calibration essentially involves calculating the correction factor (CorrectionFactor in the formula reported above) to be applied, via the multiplier 110A to the A1Gain of the block 110 in order to obtain a new overall gain indicated as NewA1Gain in the formula above.

In such a basic way of implementing solutions as described herein, calibration does not involve forcing through the VCM 120 a current which can be assumed to be already present in the context considered.

In solutions as described herein, calibration (that is, calculation of CorrectionFactor) can be based on a relationship that is found to exist between the output signal of the BEMF monitor circuit 100 (labeled as Reconstructed-BEMF), the real BEMF voltage of the VCM (this can be designated TrueBEMF) and the voltage applied to the motor across the nodes OUTP and OUTN (this can be designated Vvcm).

It is observed that the "real" resistance of the motor TrueRm and the sensing resistance Rs can be both expressed as a function of the same value of the resistance Rm underlying the A1Gain (A1Gain in the formula above), namely A1Gain=Rm/Rs, while Rs=X*Rm so that the A1Gain value can be rewritten as follows $$A1Gain = Rm/(X * Rm)$$

while the "real" or "actual" resistance of the motor (TrueRm) can be expressed as a function of a "nominal" resistance Rm as $$TrueRm = K * Rm.$$

It is otherwise observed that the voltage TrueBEMF+ $L_M di/dt$ at the time the BEMF monitor output is equal to zero (ReconstructedBEMF=0) can be expressed by the following formula $$TrueBEMF(o) + L_M di/dt = -V_{vcm}^* [(K-1)/(X+1)]$$

where:

TrueBEMF(0) is the actual value of BEMF of the VCM when the output of the BEMF monitor is equal to zero (Reconstructed BEMF=0);

the parameter K is the ratio in the expression TrueRm=K*Rm, namely the ratio of the real (actual) value of the motor resistance TrueRm to the value used for the gain A1Gain in the block 110 of the BEMF monitor circuit 100 (K=1 in case of perfect calibration, K>1 in case of motor resistance TrueRm greater than the Rm value used in the A1Gain gain, K<1 in case of motor resistance TrueRm lower than the value used during the A1Gain calibration).

That is, K can be regarded as a factor indicative of circuit de-calibration with respect to the case K=1, that indicates zero de-calibration. The factor X expresses the ratio Rs/Rm.

The voltage drop across the motor inductance $L_M$ (namely, $L_M di/dt$, where di/dt is the time derivative of the VCM current) can be reasonably neglected and, noting that Rs<<Rm (X nearly 0), the equation above can be re-written as:

$$TrueBEMF(o) \approx -V_{vcm}^*(K-1)$$

This equation facilitates acquiring the actual value of the BEMF in response to the output of the BEMF monitor is zero (ReconstructedBEMF=0).

For example:

in the case of a perfectly calibrated A1Gain (K=1)

$$TrueBEMF(o) \approx o$$

in the case of an A1Gain that is not perfectly calibrated, for example K=2, $$TrueBEMF(o) \approx -V_{vcm}$$

and so on.

As already mentioned, a calibration procedure as discussed herein is based on the calculation of a correction factor to be applied (via the multiplier 110A, for instance) to the initial value A1Gain for the block 100 as shown in FIG. 2.

The calculation of the correction factor is based on measuring:

the real BEMF of the VCM (TrueBEMF);

the voltage generated by the BEMF monitor circuit 100 (ReconstructedBEMF);

the voltage applied to the VCM ($V_{vcm}$).

Both values ReconstructedBEMF and $V_{vcm}$ can be measured as voltages occurring during normal driving of the VCM motor 120 while the value TrueBEMF can be measured by "canceling" the current $I_m$ in the VCM for a short time and measuring the voltage across the VCM motor 120 which, in the absence of the current $I_m$, corresponds to the BEMF generated by the motor.

The three voltages (TrueBEMF, ReconstructedBEMF, and $V_{vcm}$) can thus be measured with a minimal latency (ideally zero).

Figure 3:
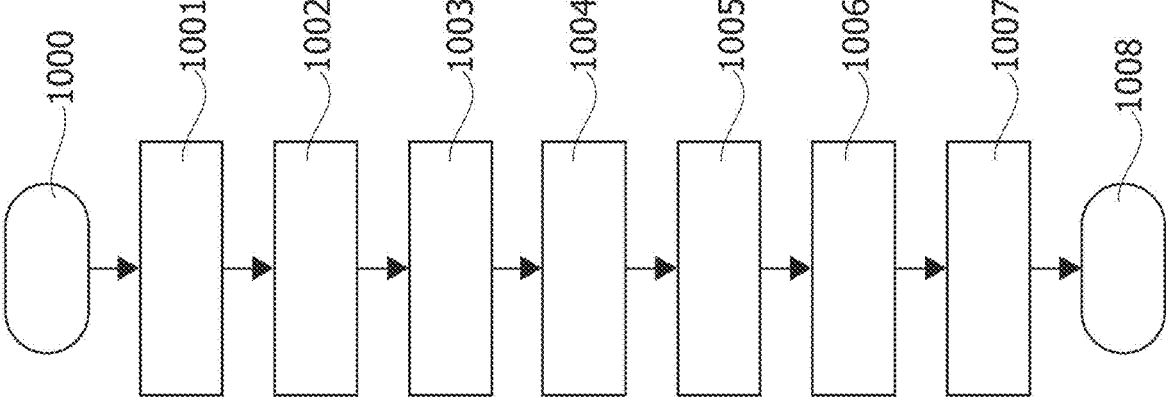
FIG. 3 is a flow-chart exemplary of possible steps in calculating a correction factor for calibration according to solutions as described herein.

FIG. 3 shows an exemplary flow chart of a procedure for performing calibration as described in the foregoing.

The blocks in FIG. 3 correspond to the following steps:

Block 1000: start of calibration

Block 1001: sample output voltage ReconstructedBEMF of BEMF monitor

Block 1002: sample $V_{vcm}$ voltage

Block 1003: force zero current $I_m$

Block 1004: wait

Block 1005: sample TrueBEMF

Block 1006: calculation of CorrectionFactor

Block 1007: calculation of NewA1Gain=A1Gain*CorrectionFactor to be applied via the multiplier 110A

Block 1008: end of calibration.

Such steps can be performed in an (otherwise conventional) circuit as illustrated in FIG. 1. Such steps can in fact take advantage of the presence of a controller unit MCU (as already provided in such a circuit) and of the existing connections (not expressly visible in the figures for simplicity) to elements in the BEMF monitor 100. Such steps can also be performed by dedicated hardware as, for example, the block 160. A multiplier such as the multiplier 110A included in such a circuit can be controlled based on values for CorrectionFactor calculated as discussed previously.

Figure 4:
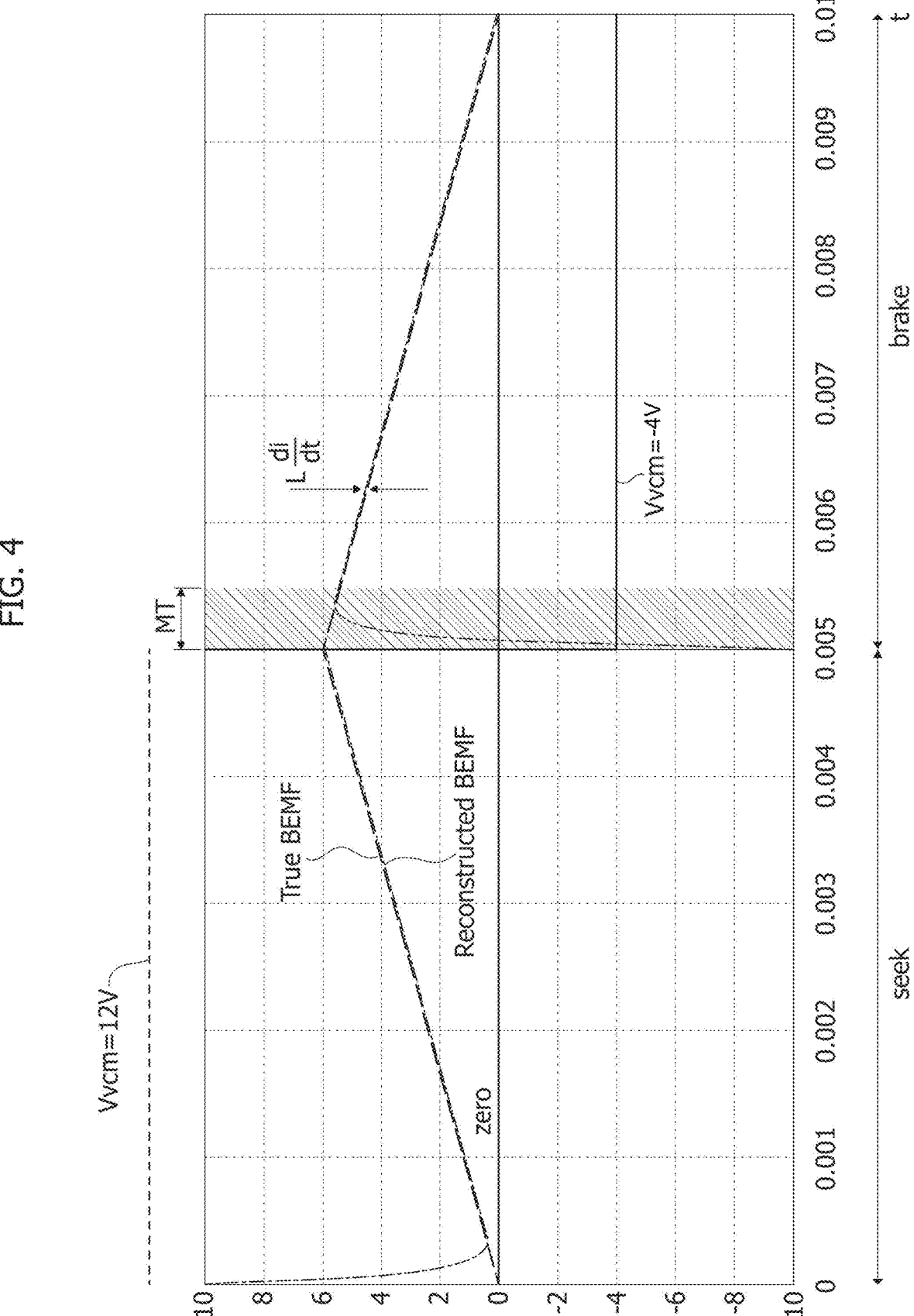
FIG. 4 is a diagram showing possible time behaviors (waveforms) of signals in a VCM during a seek phase followed by a brake phase performed in a voltage mode in the presence of correct calibration.

FIG. 4 shows (simulated) possible time behaviors (waveforms) of signals in a VCM during a seek phase (left-hand side of the figure) followed by a brake phase (right-hand side of the figure) carried out in a voltage mode in the presence of correct calibration, namely with the TrueBEMF voltage and the ReconstructedBEMF voltage represented in the case of a correctly calibrated A1Gain (K=1) during a seek procedure followed by a brake procedure.

The two signals (ReconstructedBEMF and TrueBEMF) are substantially the same during the rectilinear seek and brake phases and differ slightly only due to the voltage drop on the inductance ($L_M di/dt$) which is not compensated in the circuit of FIG. 1: if the voltage drop across the inductance is neglected (which is reasonable) the two signals coincide, with the exception of a transition between the two over which masking over a mask time MT is currently applied.

Figure 5:
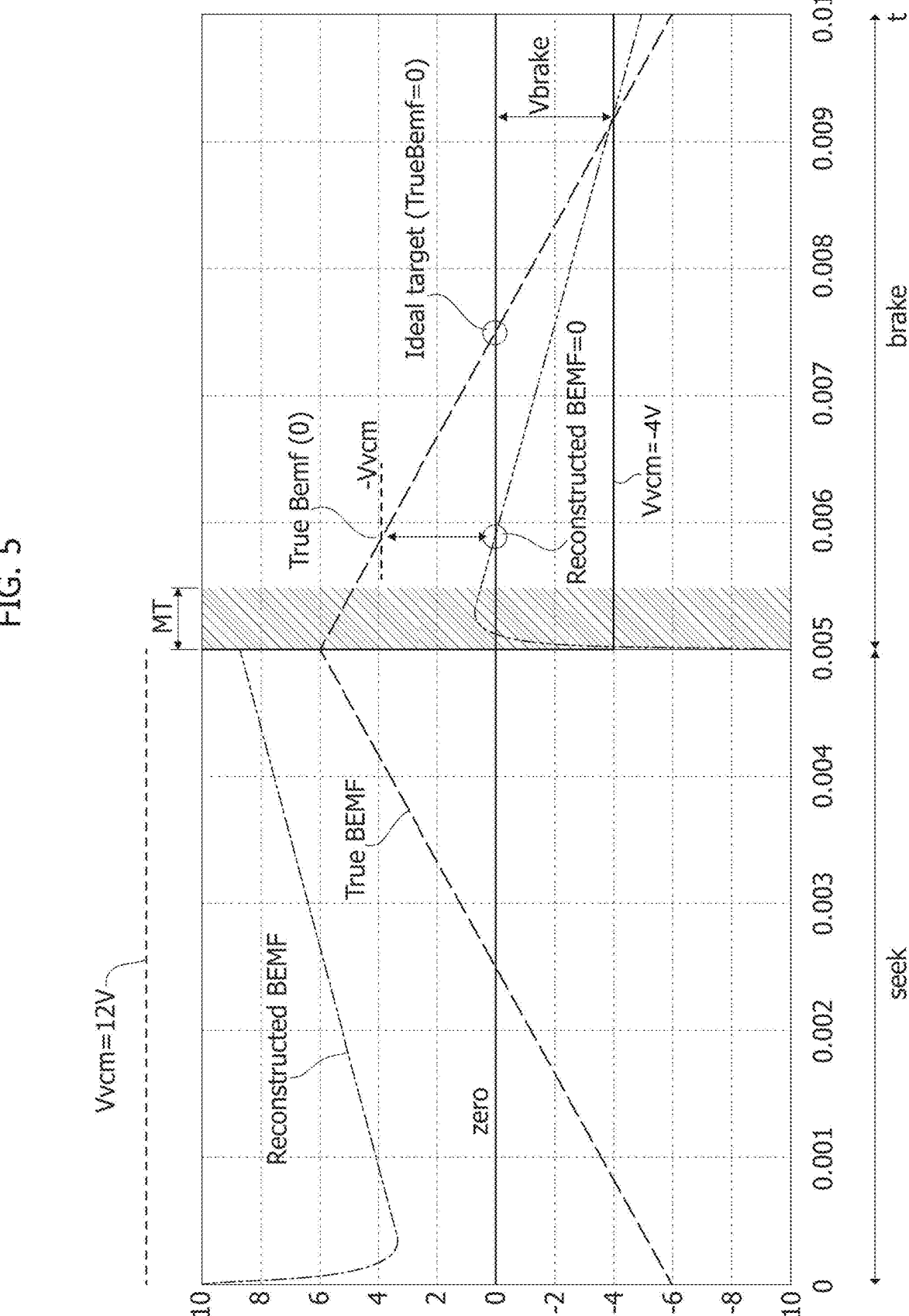
FIG. 5 is a diagram showing possible time behaviors (waveforms) of signals in a VCM during a seek phase followed by a brake phase performed in a voltage mode in the absence of correct calibration.

FIG. 5 shows (simulated) possible time behaviors (waveforms) of signals in a VCM during a seek phase (left-hand side of the figure) followed by a brake phase (right-hand side of the figure) carried out in a voltage mode in the absence of a correct calibration, that is in the exemplary case of a value A1Gain for the A1Gain not correctly calibrated (K=2).

FIG. 5 shows a value for TrueBEMF(0)=-$V_{vcm}$ consistently with the related equation discussed previously.

An advantageous value for the CorrectionFactor to be applied to the circuit in FIG. 2 to obtain a correct calibration of the BEMF monitor circuit 100 can be expressed as:

$$CorrectionFactor = [V_{vcm} - (TrueBEMF)]/(V_{vcm} - ReconstructedBEMF)$$

By analyzing FIG. 5 at the point where, during the brake phase, the signal ReconstructedBEMF is equal to zero, it can easily be verified that:

$$ReconstructedBEMF = o$$

$$TrueBEMF = -V_{vcm}$$

In connection with FIG. 5, one may assume that calibration (and thus calculation of the factor CorrectionFactor discussed previously) during the braking phase at the point in where the signal ReconstructedBEMF=0 the Correction-Factor will lead to:

$$\text{CorrectionFactor} = [V_{vcm} - (-V_{vcm})]/(V_{vcm} - (o)) = (2 * V_{vcm})/V_{vcm} = 2$$

In this exemplary case, calibration (that is, calculation of the factor CorrectionFactor) is assumed to take place at the point where the signal ReconstructedBEMF signal assumes a null value.

This assumption is merely for simplicity of description; calculation of the factor CorrectionFactor can in fact take place at any time. The point in time at which calibration is performed (calculation of the factor CorrectionFactor) is therefore completely arbitrary and not limiting.

The example in FIG. 5 refers to a case where K=2 (that is, TrueRm=2*Rm). However, calculation of the factor CorrectionFactor as described herein applies to any value of K and, therefore, for any initial value of the gain A1Gain.

To summarize, in solutions as proposed herein, the correction factor CorrectionFactor can be calculated as a function of:

the reconstructed value ReconstructedBEMF of the back electromotive force, BEMF of the VCM 120, the drive voltage $V_{vcm}$ applied to the VCM (120), and the BEMF voltage TrueBEMF from the VCM 120.

Advantageously (see the formula reported above), the correction factor can be calculated as a function of the ratio of:

the difference $[V_{vcm}-(\text{TrueBEMF})]$ between the drive voltage $V_{vcm}$ applied to the VCM 120 and the BEMF voltage TrueBEMF from the VCM 120, and the difference $(V_{vcm}-\text{ReconstructedBEMF})$ between the drive voltage $V_{vcm}$ applied to the VCM 120 and the reconstructed value ReconstructedBEMF of the back electromotive force, BEMF of the VCM 120.

FIG. 6 is exemplary of a second way of implementing solutions as described herein wherein calibration is applied with a VCM current that may be zero or nearly zero.

FIG. 6 shows, against a common time abscissa scale t, possible time behaviors (waveforms) of (from top to bottom):

a current through a VCM (VCM current, see also $I_m$ in FIGS. 1 and 2—this signal can be substituted by voltage $V_{vcm}$ with similar results);

a VCM position; and a VCM speed.

In the case of FIG. 6, calibration (starting at a time labeled Calibration start during VCM "normal" activity and ending at a time labeled Calibration stop) involves forcing a pulsed signal (a current or voltage pulse) CP over a time TON after Calibration start followed by calibration proper (calculation of a correction factor).

As a consequence, at the end of such a calibration procedure (with the VCM current brought back to zero during a time TOFF), the speed and position of the VCM motor 120 will be different from the speed and position of the VCM motor prior to calibration.

Again, such steps can be controlled in a circuit as illustrated in FIG. 1 by taking advantage of the presence of the control MCU and of existing connections (not expressly visible in the figures for simplicity). Such steps can be anyway also controlled by dedicated hardware as, for example, block 160 shown in FIG. 1.

The way of implementing solutions as described herein referred to in FIG. 6 facilitates calibration (calculation of the CorrectionFactor) in those cases where the current in the VCM is zero or in any case the current in the VCM is very small as, for example, in the case in which the VCM is in parking conditions or in track-following conditions.

In this case a calibration procedure as described in connection with FIGS. 2 to 5 is preceded by an energization phase during which a current is forced into the VCM motor winding.

In the second way of implementing a solution as described herein exemplified in FIG. 6, the position of the VCM and the speed of the VCM during the calibration procedure are represented in the second and third curves of FIG. 6 assuming that the current in the VCM has (approximatively) the time behavior exemplified in the upper curve. This may be the case of calibration performed with the VCM positioned on the surface of the disk (and therefore free to move the HDD heads) and with speed and currents initially zero or close to zero.

FIG. 6 also shows that calibration is started with a pulsed signal (a current or voltage pulse) CP forced into the VCM for a time TON and is finalized with the current force to zero for a time TOFF.

In the instants of time preceding the beginning of the time TOFF the voltages ReconstructedBEMF (from the adder SUMM3) and the voltage $V_{vcm}$ across the VCM are measured and stored (for example digitally). During the time where the current is zero (for example at the end of the time TOFF) the voltage TrueBEMF can be also measured and used for the calculation of the CorrectionFactor as described previously.

From FIG. 6 one can see that both the position (VCM position) and the speed (VCM speed) of the VCM at the end of the calibration are different from the position and the speed prior calibration.

In certain applications this difference can be considered irrelevant, and in that case this second way of implementing solutions as described herein can be advantageously used to calculate the factor CorrectionFactor without other actions involved.

The third and fourth forms of way of implementing a solution as described herein (as illustrated in FIG. 7 and FIG. 8) can be applied in those cases where a possible difference between the initial and final values of speed and position of the VCM motor may be regarded as an issue and thus deserves being taken into account.

Both FIG. 7 and FIG. 8 show, against a common time abscissa scale t, possible time behaviors (waveforms) of (from top to bottom):

a current through a VCM (VCM current, see also $I_m$ in FIGS. 1 and 2: as noted this signal could be replaced by a voltage $V_{vcm}$ with similar results);

a VCM position; and a VCM speed.

The third way of implementing solutions as described herein illustrated in FIG. 7 involves the application of two (current or voltage) pulses CP1, CP2 in rapid sequence.

The (current or voltage) pulses CP1, CP2 facilitate restoring an initial speed (velocity) for the VCM motor. For instance, if the initial speed of the VCM motor is zero, then the speed at the end of the second pulse will likewise be (approximately) zero.

Actual calibration (calculation of a correction factor) can be carried out at the end of the first pulse or at the end of the second pulse or at the end of each pulse: in the latter case two calibration steps will actually be carried out in rapid sequence.

In this third way of implementing solutions as described herein, the initial and final speed values will (approximately) coincide but the final position of the VCM motor at the end of calibration will (still) be different from the position that the VCM had before the two current pulses are applied.

That is, the third way of implementing solutions as described herein illustrated in FIG. 7 facilitates restoring the speed of the VCM, with a speed at the end of calibration (approximately) equal to the speed that the VCM had before the calibration procedure.

As illustrated in FIG. 7, that result can be achieved by applying two (current or voltage) pulses CP1, CP2 having approximately the same amplitude and duration but opposite polarities.

For instance, the first (current or voltage) pulse CP1 may have a duration TON1 and the second (current or voltage) pulse CP2 a duration TON2. By setting TON2 (at least approximately) equal to TON1 a restoration of the initial speed of the VCM is approximately achieved. These two (current or voltage) pulses can be advantageously exploited to carry out two calibrations, each one at the end of one of the (current or voltage) pulses.

As illustrated in FIG. 7, the position of the VCM at the end of the calibration will be generally different from the position before calibration.

In certain applications, this difference can be considered irrelevant, and in that case this third way of implementing solutions as described herein can be advantageously used to calculate the factor CorrectionFactor without other actions involved.

The fourth way of implementing solutions as described herein as illustrated in FIG. 8 can be applied in those cases where a possible difference between the initial and final positions of the VCM motor may be regarded as an issue and thus deserve being taken into account.

The fourth way of implementing solutions as described herein as illustrated in FIG. 8 involves applying three (or more) current or voltage pulses in a rapid sequence. These (current or voltage) pulses facilitate restoring both the initial speed and the initial position of the VCM motor, thus obtaining speed and position values at the end of the calibration equal (approximately) to the speed and position values the VCM exhibited before the calibration procedure.

As exemplified in FIG. 8, this result can be obtained by applying, for instance, three or four (current or voltage) pulses of adequate amplitude and duration.

As exemplified in FIG. 8, these pulses may include four pulses including a first (current or voltage) pulse CP1 with duration TON1, a second (current or voltage) pulse CP2 with duration TON2, a third (current or voltage) pulse CP3 of duration TON3 and a fourth (current or voltage) pulse CP4 of duration TON4 (with complementary polarities, the second pulse CP2 and the third pulse CP3 being "negative" with the first pulse CP1 and the fourth pulse CP4 "positive", for instance).

By setting TON1≈TON2≈TON3≈TON4 a restoration of the initial conditions of VCM speed and position can be achieved (at least approximately).

The fourth way of implementing solutions as described herein as illustrated in FIG. 8 can also be advantageously exploited to carry out, for instance, three or four calibrations, each one at the end of a respective current pulse.

To summarize:

FIGS. 6, 7 and 8 are exemplary of ways of implementing solutions as described herein where at least one (current or voltage) pulse (CP or CP1, CP2 or CP1, CP2, CP3, CP4) is forced through the VCM 120 concurrently (essentially prior to) producing the calibrated gain value NewA1Gain;

FIGS. 7 and 8 are exemplary of ways of implementing solutions as described herein where a plurality of (current or voltage) pulses (CP1, CP2 or CP1, CP2, CP3, CP4) are forced through the VCM 120 wherein at least one of the VCM speed and position prior to producing the calibrated gain value NewA1Gain is restored in response to the plurality of current pulses being forced through the VCM (120); optionally the plurality of (current or voltage) pulses forced through the VCM 120 comprises pulses of opposed polarity (see CP1 v. CP2 in FIG. 7 or CP1 and CP4 v. CP2 and CP3 in FIG. 8);

FIGS. 7 and 8 are exemplary of ways of implementing solutions as described herein that comprise producing (plural) respective calibrated gain values (for NewA1Gain) subsequent to forcing through the VCM 120 the plurality of (current or voltage) pulses CP1, CP2 or CP1, CP2, CP3, CP4.

It is noted that FIGS. 6, 7 and 8 are exemplary of one or more (current or voltage) pulses CP or CP1, CP2 or CP1, CP2, CP3, CP4 being forced through the VCM 120, thus causing the VCM current to switch between zero and non-zero values-during calibration (Calibration start-Calibration stop).

That is, one or more (current or voltage) pulses are forced through the VCM 120 only during to process of calculating the value CorrectionFactor that facilitates producing the calibrated gain value NewA1Gain from the gain value A1Gain.

As noted, calibration may involve measuring the value TrueBEMF by "canceling" the current $I_m$ in the VCM for a short time (see the step 1003 in the flow-chart of FIG. 3, by way of example) and measuring the voltage across the VCM motor 120.

After calibration is finalized, the VCM 120 can then be driven continuously (with the advantages associated with that kind of operation as discussed previously) based on a value of the back electromotive force, BEMF of the VCM that is reconstructed by applying to the voltage drop as available at the output of the node SUMM1, for instance, the calibrated gain value, NewA1Gain.

This facilitates driving the VCM in a continuous mode after calibration is performed—per se—in a non-continuous mode taking advantage of the "off" times. Such calibration thus facilitates continuous mode operation of the VCM after calibration is performed (in a non-continuous mode).

It is once more noted that all the ways of implementing solutions as described herein can be controlled in a circuit as illustrated in FIG. 1, supplemented with the correction feature exemplified by the multiplier 100A by taking advantage of the presence of the control MCU and of existing connections (not expressly visible in the figures for simplicity).

It is noted that using a processing module such as the unit/module MCU is not mandatory, in so far as calibration can be performed using dedicated HW (for example the block 160 shown in FIG. 1 and FIG. 2).

Without prejudice to the underlying principles, the details and embodiments may vary, even significantly, with respect to what has been described by way of example only, without departing from the extent of protection.

The extent of protection is determined by the annexed claims.

What is claimed is:

1. A method of operating a voice coil motor (VCM) in a hard disk drive, the VCM being driven based on a value of a back electromotive force (BEMF) of the VCM reconstructed as a function of a voltage drop indicative of an intensity of a current flowing towards the VCM detected by an amperometry resistance, the BEMF of the VCM being reconstructed as a function of the voltage drop via a first gain value determined as a ratio of a first VCM resistance to the amperometry resistance, the method comprising:

producing a calibrated gain value indicative of a second ratio of an actual VCM resistance to the amperometry resistance by applying a correction factor to the first gain value; and driving the VCM continuously based on a reconstructed value of the BEMF of the VCM, reconstructed by applying to the voltage drop the calibrated gain value.

2. The method of claim 1, comprising applying the correction factor to the first gain value, by multiplying the first gain value by the correction factor.

3. The method of claim 1, comprising calculating the correction factor as a function of the reconstructed value of the BEMF of the VCM, a drive voltage applied to the VCM, and a BEMF voltage from the VCM.

4. The method of claim 3, comprising calculating the correction factor as a function of a third ratio of:

a difference between the drive voltage applied to the VCM and the BEMF voltage from the VCM; and a difference between the drive voltage applied to the VCM and the reconstructed value of the BEMF of the VCM.

5. The method of claim 1, comprising forcing at least one signal pulse through the VCM concurrently with or prior to producing the calibrated gain value.

6. The method of claim 5, comprising forcing through the VCM a plurality of signal pulses, at least one of a VCM speed or a VCM position prior to producing the calibrated gain value being restored in response to the plurality of signal pulses being forced through the VCM.

7. The method of claim 6, wherein the plurality of signal pulses forced through the VCM comprises pulses of opposed polarity.

8. The method of claim 6, comprising producing respective calibrated gain values subsequent to forcing through the VCM the signal pulses in the plurality of signal pulses.

9. A control circuit configured to operate a voice coil motor (VCM) in a hard disk drive, the VCM configured to be driven based on a value of a back electromotive force (BEMF) of the VCM reconstructed as a function of a voltage drop indicative of an intensity of a current flowing towards the VCM detected by an amperometry resistance, the BEMF of the VCM being reconstructed as a function of the voltage drop via a first gain value determined as a ratio of a first VCM resistance to the amperometry resistance, the control circuit comprising:

retract logic circuitry configured to be coupled to the VCM and to, during a retract phase:

produce a calibrated gain value indicative of a second ratio of an actual VCM resistance to the amperometry resistance by applying a correction factor to the first gain value; and drive the VCM continuously based on a reconstructed value of the BEMF of the VCM, reconstructed by applying to the voltage drop the calibrated gain value.

10. The control circuit of claim 9, wherein the retract logic circuitry is configured to apply the correction factor to the first gain value, by multiplying the first gain value by the correction factor.

11. The control circuit of claim 9, wherein the retract logic circuitry is configured to calculate the correction factor as a function of the reconstructed value of the BEMF of the VCM, a drive voltage applied to the VCM, and a BEMF voltage from the VCM.

12. The control circuit of claim 11, wherein the retract logic circuitry is configured to calculate the correction factor as a function of a third ratio of:

a difference between the drive voltage applied to the VCM and the BEMF voltage from the VCM; and a difference between the drive voltage applied to the VCM and the reconstructed value of the BEMF of the VCM.

13. The control circuit of claim 9, wherein the retract logic circuitry is configured to force at least one signal pulse through the VCM concurrently with or prior to producing the calibrated gain value.

14. The control circuit of claim 13, wherein the retract logic circuitry is configured to force through the VCM a plurality of signal pulses, at least one of a VCM speed or a VCM position prior to producing the calibrated gain value being restored in response to the plurality of signal pulses being forced through the VCM.

15. The control circuit of claim 14, wherein the plurality of signal pulses forced through the VCM comprises pulses of opposed polarity.

16. The control circuit of claim 14, wherein the retract logic circuitry is configured to produce respective calibrated gain values subsequent to forcing through the VCM the signal pulses in the plurality of signal pulses.

17. A hard disk drive, comprising:

at least one voice coil motor (VCM); and a control circuit configured to operate the VCM, the VCM configured to be driven based on a value of a back electromotive force (BEMF) of the VCM reconstructed as a function of a voltage drop indicative of an intensity of a current flowing towards the VCM detected by an amperometry resistance, the BEMF of the VCM being reconstructed as a function of the voltage drop via a first gain value determined as a ratio of a first VCM resistance to the amperometry resistance, the control circuit comprising retract logic circuitry coupled to the VCM and configured to, during a retract phase:

produce a calibrated gain value indicative of a second ratio of an actual VCM resistance to the amperometry resistance by applying a correction factor to the first gain value; and drive the VCM continuously based on a reconstructed value of the BEMF of the VCM, reconstructed by applying to the voltage drop the calibrated gain value.

18. The hard disk drive of claim 17, wherein the retract logic circuitry is configured to apply the correction factor to the first gain value, by multiplying the first gain value by the correction factor.

19. The hard disk drive of claim 17, wherein the retract logic circuitry is configured to calculate the correction factor as a function of the reconstructed value of the BEMF of the VCM, a drive voltage applied to the VCM, and a BEMF voltage from the VCM.

20. The hard disk drive of claim 17, wherein the retract logic circuitry is configured to force at least one signal pulse through the VCM concurrently with or prior to producing the calibrated gain value.

* * * * *